United States Patent
Ohno et al.

(10) Patent No.: US 7,815,994 B2
(45) Date of Patent: Oct. 19, 2010

(54) METHOD FOR PRODUCING POROUS BODY, POROUS BODY, AND HONEYCOMB STRUCTURE

(75) Inventors: Kazushige Ohno, Gifu (JP); Hiroki Sato, Gifu (JP); Masayuki Hayashi, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 0 days.

(21) Appl. No.: 11/730,381

(22) Filed: Mar. 30, 2007

(65) Prior Publication Data
US 2007/0172632 A1    Jul. 26, 2007

Related U.S. Application Data

(63) Continuation of application No. PCT/JP2005/017367, filed on Sep. 21, 2005.

(30) Foreign Application Priority Data
Sep. 30, 2004    (JP)    ............................. 2004-287908

(51) Int. Cl.
B32B 3/12     (2006.01)
B32B 3/26     (2006.01)
B28B 23/00    (2006.01)
B28B 1/00     (2006.01)
B28B 3/20     (2006.01)
C04B 35/00    (2006.01)
C04B 35/64    (2006.01)
B01D 39/06    (2006.01)

(52) U.S. Cl. .................. 428/116; 428/34.5; 428/304.4; 501/153; 501/154; 55/523; 264/630

(58) Field of Classification Search ................. 428/116, 428/188, 34.5, 304.4; 501/118, 153, 154; 55/523
See application file for complete search history.

(56) References Cited

U.S. PATENT DOCUMENTS 2,171,290 A * 8/1939 Hobart ........................ 501/80

(Continued)

FOREIGN PATENT DOCUMENTS

EP    0 369 330 A2    5/1990

(Continued)

OTHER PUBLICATIONS

International Preliminary Report on Patentability (PCT/JP2005/017367).

(Continued)

Primary Examiner—David R Sample
Assistant Examiner—Nicole T Gugliotta
(74) Attorney, Agent, or Firm—Finnegan, Henderson, Farabow, Garrett & Dunner, LLP

(57) ABSTRACT

The invention provides a method for producing a porous body comprising: a starting material mixing step of mixing ceramic particles serving as an aggregate and a sintering aid which includes at least one element selected from the group consisting of rare earth elements, alkaline earth elements, Al and Si such that the amount of the sintering aid is about 1.0% by weight or less relative to the total amount of the ceramic particles and the sintering aid to form a puddle; and a molding and firing step of molding the puddle into a molded body and firing the molded body.

17 Claims, 9 Drawing Sheets

U.S. PATENT DOCUMENTS

| | | | | |
|---|---|---|---|---|
| 4,839,214 | A | * | 6/1989 | Oda et al. ............... 428/116 |
| 4,994,418 | A | * | 2/1991 | Yamakawa et al. ........ 501/95.2 |
| 5,130,055 | A | * | 7/1992 | Yasutomi et al. ........... 252/516 |
| 5,750,449 | A | * | 5/1998 | Niihara et al. ............... 501/80 |
| 5,789,057 | A | * | 8/1998 | Naitou et al. ................ 428/73 |
| 5,820,967 | A | * | 10/1998 | Gadkaree ................... 428/116 |
| 5,942,454 | A | * | 8/1999 | Nakayama et al. ........... 501/88 |
| 6,287,523 | B1 | * | 9/2001 | Hirohashi et al. ........... 422/180 |
| 6,413,895 | B1 | * | 7/2002 | Merkel ....................... 501/134 |
| 6,706,428 | B2 | * | 3/2004 | Kobayashi et al. .......... 428/698 |
| 2003/0014856 | A1 | * | 1/2003 | Yamaguchi et al. ........... 29/559 |
| 2003/0186801 | A1 | * | 10/2003 | Inoue et al. ................ 501/97.1 |
| 2008/0286524 | A1 | | 11/2008 | Ohno et al. |

FOREIGN PATENT DOCUMENTS

| | | | | |
|---|---|---|---|---|
| EP | 1 277 714 | A1 | | 1/2003 |
| EP | 1 338 322 | A1 | | 8/2003 |
| EP | 1486242 | A1 | * | 12/2004 |
| EP | 1 652 831 | A1 | | 5/2006 |
| EP | 1 759 754 | A1 | | 3/2007 |
| EP | 1 808 228 | A1 | | 7/2007 |
| JP | 60-239360 | | | 11/1985 |
| JP | 63-190758 | | | 8/1988 |
| JP | 2001-151579 | | | 6/2001 |
| JP | 2002-234779 | | | 8/2002 |
| WO | WO 02/76908 | | * | 3/2002 |
| WO | WO 02/081054 | A1 | * | 10/2002 |
| WO | WO 2006/028506 | A2 | | 3/2006 |

OTHER PUBLICATIONS

Supplementary European Search Report dated Jun. 3, 2009, mailed from the European Patent Office in corresponding European Application No. EP 05 78 5476.

* cited by examiner (a)

(b)

HONEYCOMB FILTER 20

HONEYCOMB FILTER 30

(a) Mixing ratio of alumina : 1.0 % by weight (c) Mixing ratio of alumina : 5.0 % by weight (b)

(d)

(a) Mixing ratio of alumina : 0.5 % by weight (b)

(c) Mixing ratio of alumina : 5.0 % by weight (d)

(a)

(b)

(a)

(b)

METHOD FOR PRODUCING POROUS BODY, POROUS BODY, AND HONEYCOMB STRUCTURE

CROSS-REFERENCE OF RELATED APPLICATIONS

This is a continuation of the International Application No. PCT/JP2005/017367 filed on Sep. 21, 2005.

BACKGROUND OF THE INVENTION

1. Field of the Invention

The present invention relates to a method for producing a porous body, a porous body, and a honeycomb structure.

2. Description of the Related Art

As the method for producing a dense sintered silicon carbide ceramic body, a method has been known in which alumina, which is a sintering aid, in an amount in the range of 2% to 25% by weight, is mixed to silicon carbide, molding is performed at a pressing pressure of 2,000 kg/cm$^2$, and hot-press sintering is performed in an argon gas atmosphere at a firing temperature of 1,900° C. under a pressure of 200 kg/cm$^2$. For example, in the method described in JP-A 60-239360, since sintering of silicon carbide is accelerated by alumina, the firing temperature can be decreased and a sintered body having high strength at room temperature can be obtained. However, the sintered body produced by this method has a problem in that, in contrast with the strength at room temperature, the bending strength at 1,400° C. decreases. On the other hand, in the production method described in JP-A 63-190758, alumina in an amount in the range of 1% by weight or less is mixed to silicon carbide, molding is performed at a pressing pressure of 7,000 kg/cm$^2$, and sintering is performed in an argon gas atmosphere at a firing temperature of 1,900° C. under normal pressure. In the sintered body obtained by this method, presence of aluminum is not observed in grain boundaries of silicon carbide, and the bending strength at 1,500° C. is higher than the bending strength at room temperature. The entire contents of JP-A 60-239360 and JP-A 63-190758 are incorporated herein.

SUMMARY OF THE INVENTION

The present invention provides a method for producing a porous body including: a starting material mixing step of mixing ceramic particles serving as an aggregate and a sintering aid which includes at least one element selected from the group consisting of rare earth elements, alkaline earth elements, Al and Si such that the amount of the sintering aid is about 1.0% by weight or less relative to the total amount of the ceramic particles and the sintering aid to form a puddle; and a molding and firing step of molding the puddle into a molded body and firing the molded body.

In the method for producing a porous body of the invention, in the starting material mixing step, mixing is preferably performed such that the amount of the sintering aid is about 0.1% to about 0.7% by weight relative to the total amount of the ceramic particles and the sintering aid. In the starting material mixing step, the sintering aid preferably includes alumina.

In the method for producing a porous body of the invention, in the starting material mixing step, the ceramic particles preferably include silicon carbide. In this case, in the molding and firing step, the firing temperature is preferably in the range of about 1,900° C. to about 2,100° C.

In the method for producing a porous body of the invention, in the molding and firing step, extrusion molding is preferably performed at a pressure of about 20 MPa or less.

In the method for producing a porous body of the invention, the ceramic particles are preferably a mixture of coarse-grained silicon carbide particles having a predetermined average particle size and fine-grained silicon carbide particles having an average particle size smaller than the predetermined average particle size. In this case, the coarse-grained silicon carbide particles preferably have the average particle size of about 5 to about 100 µm, and the fine-grained silicon carbide particles preferably have the average particle size of about 0.1 to about 10 µm.

In the method for producing a porous body of the invention, the ceramic particles preferably include coarse-grained silicon carbide particles and fine-grained silicon carbide particles, the sintering aid preferably includes alumina, and the mixing ratio of the coarse-grained silicon carbide particles, fine-grained silicon carbide particles, and alumina is preferably about 60 to about 80% by weight, about 18 to about 38% by weight, and about 0.1 to about 1.0% by weight, respectively, to the total amount of the coarse-grained silicon carbide particles, fine-grained silicon carbide particles, and alumina.

The present invention also provides a porous body including: ceramic particles serving as an aggregate; and at least one element selected from the group consisting of rare earth elements, alkaline earth elements, Al, and Si, where the bending strength at 900° C. is about 55% or more relative to the bending strength at room temperature.

In this porous body of the invention, the bending strength at 900° C. is preferably about 80% or more relative to the bending strength at room temperature. And both the bending strength at 900° C. and the bending strength at room temperature are preferably about 25 MPa or more. The ceramic particles preferably include silicon carbide. The element is preferably Al.

The present invention also provides a honeycomb structure including the porous body of the invention described above. In this honeycomb structure, the bending strength of the porous body at 900° C. is preferably about 80% or more relative to the bending strength at room temperature. And both the bending strength of the porous body at 900° C. and the bending strength at room temperature are preferably about 25 MPa or more. The ceramic particles in the porous body preferably include silicon carbide. The element in the porous body is preferably Al. The honeycomb structure of the invention preferably has a shape of cylindrical pillar and has multiple through holes obtained by integral molding. And sealing portions may be provided at alternate ends of the multiple through holes, otherwise sealing portions may not be provided.

The present invention also provide another honeycomb structure including: a plurality of porous bodies of the invention; a sealing layer that joins the porous bodies to each other; and a coating layer that coats an outer circumferential surface of the joined porous bodies, where each of the porous bodies has multiple through holes that are arranged along the longitudinal direction of the porous body. In this honeycomb structure of the invention, too, sealing portions may be provided at alternate ends of the multiple through holes, or sealing portions may not be provided.

BEST MODES FOR CARRYING OUT THE INVENTION

Figure 1:
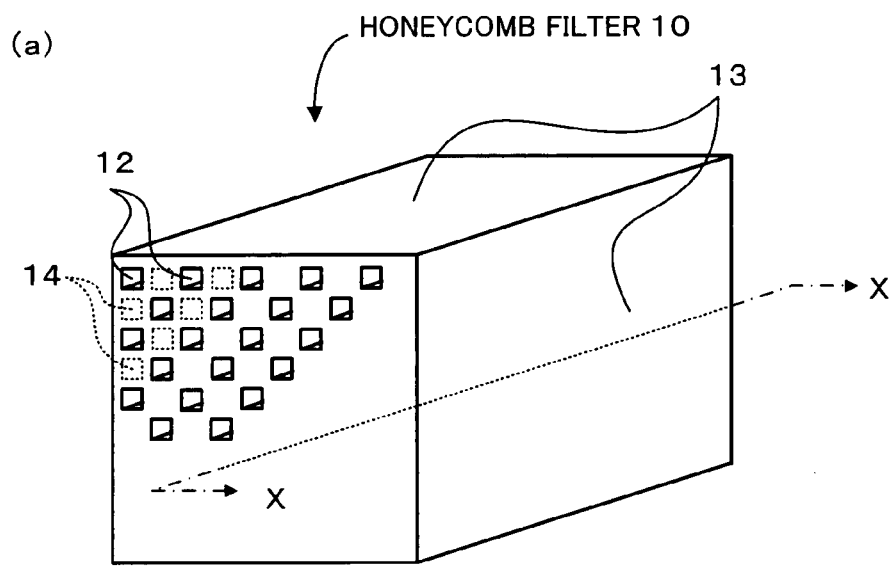
FIG. 1(a) is a schematic perspective view showing a honeycomb filter 10 according to an embodiment of the present invention.
FIG. 1(b) is a sectional view taken along the line X-X of FIG. 1(a).
Figure 1:
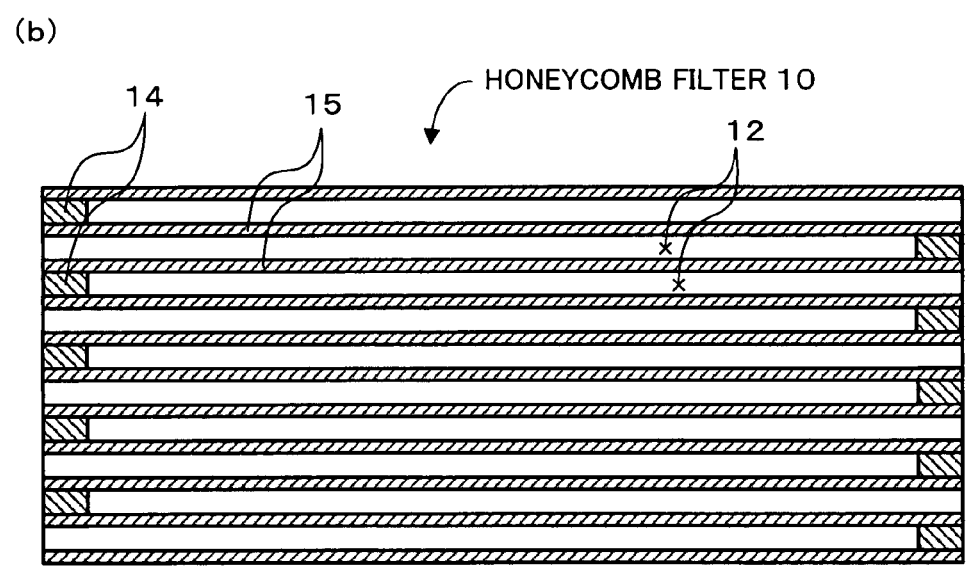

A method for producing a porous body according to one embodiment of the invention includes a starting material mixing step of mixing ceramic particles serving as an aggregate and a sintering aid which includes at least one element selected from the group consisting of rare earth elements, alkaline earth elements, Al and Si such that the amount of the sintering aid is about 1.0% by weight or less relative to the total amount of the ceramic particles and the sintering aid to form a puddle; and a molding and firing step of molding the puddle into a molded body and firing the molded body.

In the method of this embodiment, ceramic particles and a sintering aid that accelerates sintering of ceramic particles are mixed to form a puddle, the puddle is molded into a molded body, and the molded body is fired. At this time, since sintering of ceramic particles is accelerated by the sintering aid, it is more possible to perform firing at low temperature compared with the case where ceramic particles are sintered without using a sintering aid. Furthermore, when the amount of the sintering aid is about 1.0% by weight or less relative to the total amount of the ceramic particles and the sintering aid, the strength at high temperature is not easily decreased. Consequently, in this production method, the firing temperature can be decreased and a decrease in the ratio of the strength at high temperature to the strength at room temperature can be relatively easily suppressed.

In the method of this embodiment, in the starting material mixing step, preferably, mixing is performed such that the amount of the sintering aid is about 0.1% to about 0.7% by weight relative to the total amount of the ceramic particles and the sintering aid. When the amount of the sintering aid is about 0.1% by weight or more, the effect of accelerating sintering of ceramic particles is easily obtained, and the strength at room temperature is not easily undesirably decreased. Furthermore, when the amount of the sintering aid is about 0.7% by weight or less, the decrease in the strength at high temperature can be easily suppressed sufficiently.

In the method of this embodiment, examples of the element contained in the sintering aid include rare earth elements, such as Y, Er. Yb, La, Sc, Ce, Nd, Dy, Sm, and Gd; alkaline earth elements, such as Mg, Ca, Ba, and Sr; and other elements, such as Al, Si, and B. Among these, preferably, alumina, which is an oxide of Al, is contained in the sintering aid. The reason for this is that alumina can relatively easily accelerate sintering of ceramic particles. Other examples of the element contained in the sintering aid include alkali metals, such as Na, K, and Li.

In the method of this embodiment, the ceramic particles comprise, for example, at least one kind of particles selected from the group consisting of silicon carbide, silicon nitride, alumina, silica, zirconia, titania, ceria, and mullite. Among these, silicon carbide is preferable. Since silicon carbide has high thermal conductivity and is often used for porous bodies, use of silicon carbide is significant to the present invention. In such a case, the firing temperature is preferably in the range of about 1,900° C. to about 2,100° C. Silicon carbide is not easily sintered, and it is necessary to perform firing at high temperature (e.g., about 2,200° C.) to cause sintering. However, in the production method of this embodiment, since the sintering aid is mixed, even at a firing temperature in the range of about 1,900° C. to about 2,100° C., satisfactory strength can be relatively easily obtained.

In the method of this embodiment, in the molding and firing step, extrusion molding may be performed at a pressure of about 20 MPa or less. In such a manner, since ceramic particles are not easily densified, a porous material can be obtained relatively easily.

A porous body according to one embodiment of the invention includes ceramic particles serving as an aggregate, and at least one element selected from the group consisting of rare earth elements, alkaline earth elements, Al, and Si, wherein the bending strength at 900° C. is about 55% or more relative to the bending strength at room temperature.

The porous body of this embodiment includes ceramic particles and at least one element selected from the group consisting of rare earth elements, alkaline earth elements, Al, and Si, and the bending strength at 900° C. is about 55% or more relative to the bending strength at room temperature. In the porous body of this embodiment, even if the ceramic particles contain the element described above, the bending strength at 900° C. is about 55% or more relative to the bending strength at room temperature. In such a case, preferably, the strength at 900° C. is about 80% or more relative to the strength at room temperature.

In the porous body of this embodiment, both the bending strength at 900° C. and the bending strength at room temperature are preferably about 25 MPa or more. The reason for this is that when both the bending strength at 900° C. and the bending strength at room temperature are 25 MPa or more, the porous body has strength sufficient for practical use.

In the porous body of this embodiment, the ceramic particles comprise, for example, at least one kind of particles selected from the group consisting of silicon carbide, silicon nitride, alumina, silica, zirconia, titania, ceria, and mullite. Among these, silicon carbide is preferable. Since silicon carbide has high thermal conductivity and is often used for porous bodies, use of silicon carbide is significant to the present invention.

In the porous body of this embodiment, the element contained in the porous body is preferably Al. Al may be mixed to the porous body as alumina, and alumina can relatively easily accelerate sintering of ceramic particles.

A honeycomb structure according to one embodiment of the invention includes the porous body according to any of the various embodiments described above. In the porous body of the embodiment described above, a decrease in the ratio of the strength at high temperature to the strength at room temperature can be relatively easily suppressed. Consequently, the same effect can be achieved in the honeycomb structure composed of the porous body.

Best modes for carrying out the present invention will now be described in detail below with reference to the drawings.

First, a honeycomb filter 10, which is a honeycomb structure in the shape of a filter according to an embodiment of the present invention, will be described. FIG. 1(a) is a schematic perspective view showing the honeycomb filter 10 according to an embodiment of the present invention, and FIG. 1(b) is a sectional view taken along the line X-X of FIG. 1(a). The honeycomb filter 10 is a ceramic filter that purifies particulate matter contained in exhaust emissions. The honeycomb filter 10 has a rectangular pillar shape and has a plurality of through-holes 12 arranged in parallel in the longitudinal direction. In the honeycomb filter 10, end faces of the through-holes 12 are alternately plugged with plugging portions 14. Consequently, in the honeycomb filter 10, exhaust emissions flowing from an inlet of a through-hole 12 pass through a partition wall 15 into the adjacent through-hole 12, and at this time, particulate matter contained in exhaust emissions is captured by the wall 15 of the honeycomb filter 10.

The honeycomb filter 10 has a porosity of preferably about 35% to about 70%, and more preferably about 50% to about 70%. When the porosity is about 35% or more, in some cases, it is easy to obtain the function of purifying particulate matter desirably sufficiently. When the porosity is about 70% or less, the strength is not easily undesirably decreased. The honeycomb filter 10 has outside dimensions of 34.3 mm×34.3 mm×150 mm. The thickness of the partition wall 15 between the adjacent through-holes 12 is set in the range of about 0.1 to about 10.0 mm (more preferably in the range of about 0.2 to about 6.0 mm), and the number of through-holes 12 per unit area is set at about 0.16 to about 62 pieces/cm$^2$ (about 1.0 to about 400 cpsi). In this example, each of the through-holes 12 has a square cross-sectional shape. Each of the through-holes 12 may have, for example, a substantially triangular or substantially hexagonal cross-sectional shape.

The honeycomb filter 10 contains silicon carbide as ceramic particles serving as an aggregate and elemental Al derived from alumina serving as a sintering aid. The amount of elemental Al contained in the honeycomb filter 10 is, in terms of alumina, in the range of about 0.1% to about 1.0% by weight (more preferably, in the range of about 0.3% to about 0.7% by weight), and in terms of aluminum metal, in the range of about 0.05% to about 0.5% by weight (more preferably, in the range of about 0.15% to about 0.35% by weight). Both the bending strength at 900° C. and the bending strength at room temperature (e.g., 25° C.) of the honeycomb filter 10 are about 25 MPa or more, and the bending strength at 900° C. is about 55% or more (in particular, about 80% or more) relative to the bending strength at room temperature. Furthermore, the neck areas, in which silicon carbide particles contained in the honeycomb filter 10 are bound together, are primarily composed of silicon carbide, and elemental Al mixed as the sintering aid is present in parts of the neck areas.

Next, each step of a method for producing the honeycomb filter 10 will be described. The method for producing the honeycomb filter 10 will be described in which silicon carbide is used as ceramic particles and alumina is used as a sintering aid. As the silicon carbide, a mixture of coarse particles having a predetermined particle size (hereinafter referred to as "coarse-grained silicon carbide") and fine particles composed of the same material as the coarse particles and having an average particle size smaller than the predetermined particle size (hereinafter referred to as "fine-grained silicon carbide") is used. The fine-grained silicon carbide may have a different crystalline form from that of the coarse-grained silicon carbide. The average particle size is determined by a laser diffraction scattering method using a Mastersizer Micro manufactured by MALVERN Instruments Ltd.

(1) Starting Material Mixing Step

Coarse-grained silicon carbide to be used, which is a starting material for the honeycomb filter, has an average particle size in the range of about 5 to about 100 μm (preferably about 20 to about 40 μm). Fine-grained silicon carbide to be used has an average particle size in the range of about 0.1 to about 10 μm (preferably in the range of about 0.1 to about 5 μm). Alumina to be used has an average particle size in the range of about 0.1 to about 10 μm (preferably in the range of about 0.1 to about 5 μm). The fine-grained silicon carbide to be used has a smaller average particle size than that of the coarse-grained silicon carbide. Note that alumina has high stability at high temperatures, functions as a sintering aid effectively, and can accelerate sintering of silicon carbide. With respect to the mixing ratio of the starting materials, preferably, the amount of coarse-grained silicon carbide is about 60% to about 80% by weight (in particular, about 65% to about 75% by weight), the amount of fine-grained silicon carbide is about 18% to about 38% by weight (in particular, about 25% to about 30% by weight), and the amount of alumina is about 0.1% to about 1.0% by weight (in particular, about 0.1% to about 0.7% by weight), relative to the total amount of coarse-grained silicon carbide, fine-grained silicon carbide, and alumina. When the amount of coarse-grained silicon carbide is about 60% by weight or more, the amounts of fine-grained silicon carbide and alumina does not increase relatively, and the pore size of the honeycomb filter does not undesirably decrease. When the amount is about 80% by weight or less, the amounts of fine-grained silicon carbide and alumina does not decrease relatively, and strength is not easily undesirably decreased. Furthermore, when the amount of fine-grained silicon carbide is about 18% by weight or more, the amount of the material that forms the connection areas (neck areas) between particles of coarse-grained silicon carbide does not decrease, and thermal conductivity and thermal shock resistance do not easily undesirably decrease. When the amount is about 38% by weight or less, the pore size of the honeycomb filter does not easily undesirably decrease. Furthermore, when the amount of alumina is about 0.1% by weight or more, it is relatively easy to obtain the effect of accelerating sintering of silicon carbide. When the amount is about 1.0% by weight or less, the amount of the aluminum component present in the neck areas does not easily increase, and high-temperature strength is not undesirably decreased.

Subsequently, about 15 parts by weight or less (more preferably about 8 to about 12 parts by weight) of a pore-forming agent is mixed to 100 parts by weight of a mixture of the coarse-grained silicon carbide, fine-grained silicon carbide, and alumina described above. When the pore-forming agent is mixed in an amount of about 15 parts by weight or less, the strength of the honeycomb filter 10 after firing is not undesirably decreased. Examples of the pore-forming agent include at least one kind of material selected from balloons that are fine hollow spheres containing an oxide-based ceramic as a main component, spherical acrylic particles, graphite, and the like. Examples of the oxide balloons include at least one kind of balloons selected from alumina balloons, glass microballoons, Shirasu balloons, fly ash balloons, mullite balloons, and the like. The amount of the pore-forming agent added (including the case where no addition is made) is appropriately selected depending on the porosity of the desired honeycomb filter. Subsequently, about 10 to about 30 parts by weight of water is added to 100 parts by weight of a mixture of the coarse-grained silicon carbide, fine-grained silicon carbide, and alumina, followed by mixing to form a puddle. As the dispersion medium, in addition to water, for example, an organic solvent (benzene or the like) or an alcohol (methanol or the like) may be used. Additionally, an organic binder and a molding aid may be appropriately added to the puddle in view of moldability. Examples of the organic binder include at least one organic binder selected from methyl cellulose, carboxymethyl cellulose, hydroxyethyl cellulose, and polyethylene glycol. The amount of the organic binder used is preferably about 1 to about 10 parts by weight relative to 100 parts by weight of the total amount of coarse-grained silicon carbide, fine-grained silicon carbide, and alumina. Examples of the molding aid include ethylene glycol, dextrin, fatty acid, fatty acid soaps, and polyalcohols. The puddle may be mixed, for example, using, a mixer, an attritor, or the like, or may be kneaded thoroughly using a kneader or the like.

(2) Molding and Firing Step

The puddle containing coarse-grained silicon carbide, fine-grained silicon carbide, and alumina prepared in the starting material mixing step is molded into a honeycomb shape. As the method for molding the puddle, extrusion, slip casting, pressing, or the like may be used. Herein, molding is performed by extrusion at a molding pressure of about 20 MPa or less (more preferably about 3 to about 12 MPa). The shape of the honeycomb filter to be formed may be selected appropriately, depending on the intended use or the like. Any shape or size may be selected, and for example, the shape may be cylindrical, rectangular pillar, or cylindroid. Herein, a rectangular pillar honeycomb shape in which a plurality of through-holes are arranged in parallel in the longitudinal direction is formed. The size of the through-holes 12, the number of through-holes 12, and the thickness of a partition wall between the adjacent through-holes 12 may be selected appropriately, depending on the purpose of intended use. The sectional shape of each of the through-holes may be rectangular, triangular, or hexagonal. Since fine-grained silicon carbide and alumina are mixed in the puddle, molding is performed in a state in which the fine-grained silicon carbide and alumina are included between particles of coarse-grained silicon carbide. The resulting raw molded body is dried, and then only one end face of each of the plurality of through-holes 12 is plugged by a plugging portion 14 composed of a paste having the same composition as that of the puddle described above. Specifically, with respect to the plurality of through-holes 12, through-holes 12 having a first plugged end face and a second open end face and through-holes 12 having a first open end face and a second plugged end face are alternately arranged.

Subsequently, the resulting raw molded body is dried and fired. Drying is performed at a temperature of about 100° C. to about 200° C. using a microwave dryer, a hot-air dryer, or the like. When an organic component, such as an organic binder, is added in the starting material mixing step, preferably, calcination is performed before firing to degrease the organic component. The calcination conditions are appropriately selected depending on the amount and kind of the organic component added. For example, the calcination is performed by heating at about 300° C. to about 650° C. in an oxygen atmosphere. Firing of the molded body is carried out, for example, under the following conditions: in an inert gas atmosphere, such as nitrogen or argon, at about 1,500° C. to about 2,200° C. (more preferably, about 1,900° C. to about 2,100° C.). Herein, since sintering of silicon carbide is accelerated by the sintering aid, it is possible to decrease the firing temperature as compared with the case where silicon carbide is sintered without using a sintering aid. Thereby, the honeycomb filter 10 according to this embodiment can be obtained.

Figure 2:
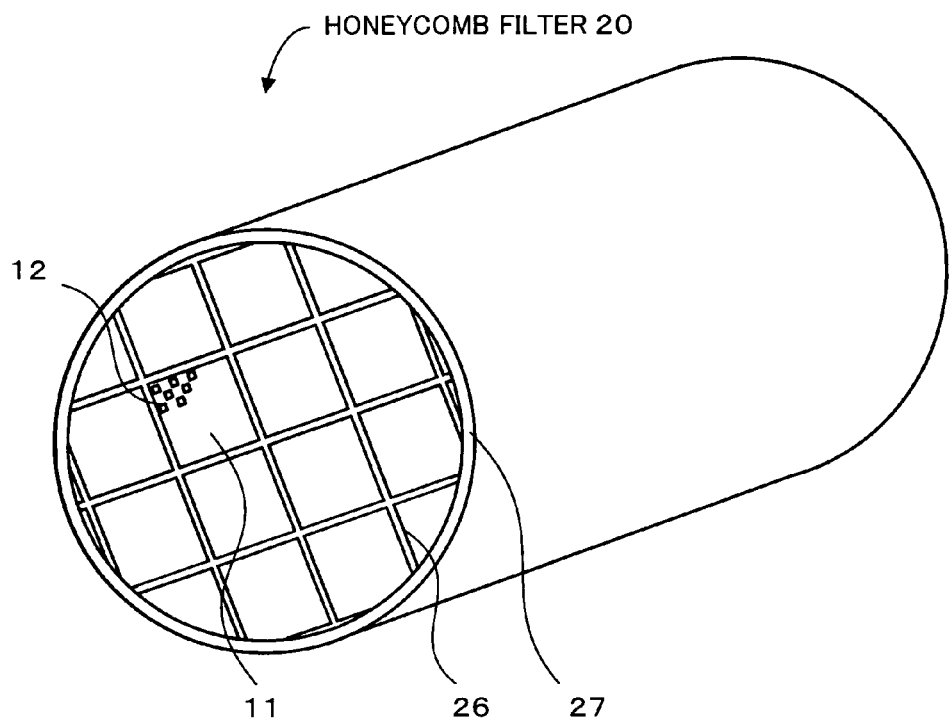
FIG. 2 is a schematic diagram showing a honeycomb filter 20 according to an embodiment of the present invention.
Figure 3:
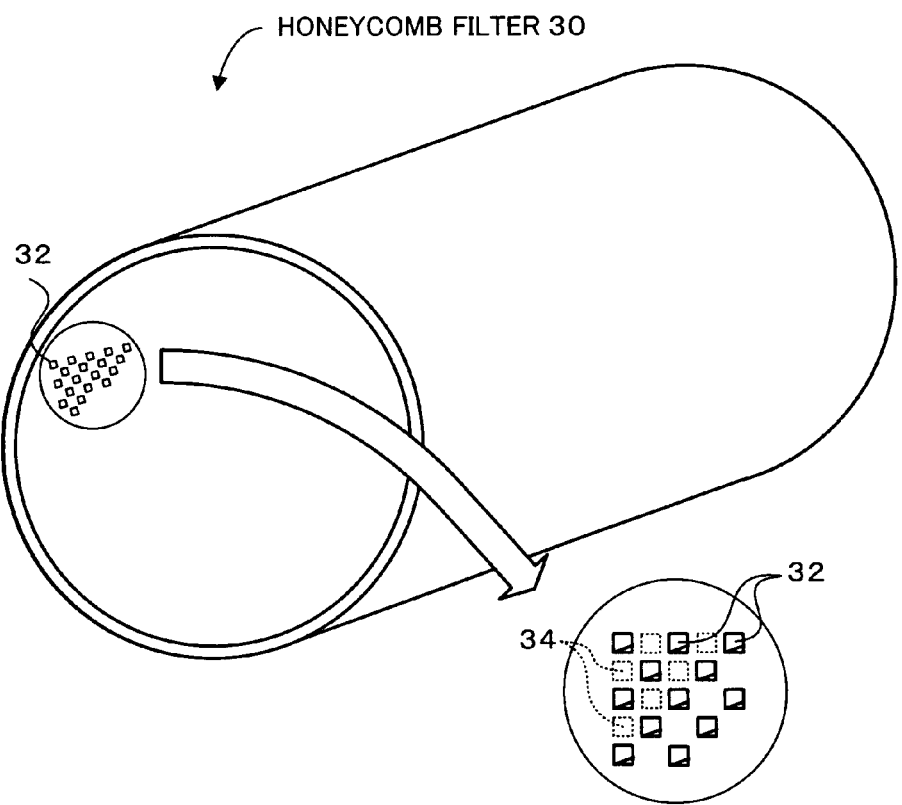
FIG. 3 is a schematic diagram showing a honeycomb filter 30 according to an embodiment of the present invention.

The method for producing the rectangular pillar honeycomb filter 10 is described above. As shown in FIG. 2, using the honeycomb filter 10 as a honeycomb unit 11, a plurality of honeycomb units 11 may be joined and formed into a cylindrical shape to produce a honeycomb filter 20. The honeycomb filter 20 includes a plurality of honeycomb units 11, each honeycomb unit 11 having a rectangular pillar shape and having a plurality of through-holes 12 arranged in parallel in the longitudinal direction; a sealing material layer 26 which joins the outer surfaces 13 of the honeycomb units 11, in which the through-holes 12 are not open; and a coating material layer 27 which covers the outer circumferential surface in which the through-holes 12 are not open. A method for producing the honeycomb filter 20 will be described below. First, a plurality of honeycomb filters 10 are produced as honeycomb units 11. A sealing material paste is applied to the outer surface 13 of each honeycomb unit 11 and a plurality of honeycomb units 11 are joined. The paste is dried and solidified at about 120° C. to form a sealing material layer 26. The resulting joined product is cut into a cylindrical shape with a diamond cutter or the like. The outer circumferential surface thereof, in which the through-holes 12 are not open, is coated with a paste similar to the sealing material paste. Drying and solidification are performed at about 120° C. to form a coating material layer 27. A honeycomb filter 20 is thereby obtained. Herein, the sealing material paste which can be used contains at least one of inorganic fibers and inorganic particles and appropriately contains an inorganic binder or an organic binder. Examples of the inorganic fibers include at least one kind of ceramic fibers selected from silica-alumina, mullite, alumina, silica, and the like. Examples of the inorganic particles include at least one kind of particles selected from silicon carbide, silicon nitride, boron nitride, and the like. Examples of the inorganic binder include at least one binder selected from silica sol, alumina sol, and the like. Examples of the organic binder include at least one binder selected from polyvinyl alcohol, methyl cellulose, ethyl cellulose, carboxymethyl cellulose, and the like. Furthermore, as shown in FIG. 3, a cylindrical honeycomb filter 30 having through-holes 32 may be integrally molded, and by providing plugging portions 34 in alternate end faces of the though-holes 32 of the honeycomb filter 30, an integral type DPF may be produced. Furthermore, a honeycomb structure in which the plugging portions 14 of the honeycomb filter 10 or 20 or the plugging portions 34 of the honeycomb filter 30 are not provided may be produced.

The application of the honeycomb filter 10 has been described as purification of particulate matter contained in exhaust emissions. The honeycomb filter 10 may also be used as a catalyst carrier for carrying a catalyst that converts exhaust gas of vehicles. Furthermore, the honeycomb filter 10 can also be used in the application in which a catalyst is not carried (for example, adsorbents which adsorb gas components, liquid components, and the like).

In the honeycomb filter 10 produced by the production method described above, the bending strength at 900° C. is about 55% or more (in particular, about 80% or more) relative to the bending strength at room temperature. Although not clear at present, the reason for the fact that the high-temperature bending strength is not decreased is believed to be as follows. That is, in the raw molded body before firing, fine-grained silicon carbide and alumina are included between particles of coarse-grained silicon carbide. When the molded body is fired, neck areas in which particles of coarse-grained silicon carbide are bound to one another are formed. Substances containing aluminum may be fixed around the neck areas, or the neck areas by themselves may be composed of a substance containing aluminum. The reason for the fact that the neck areas are mainly composed of silicon carbide is assumed to be that fine-grained silicon carbide enters between particles of coarse-grained silicon carbide during molding. When the molded body is fired in an inert gas at high temperatures, in some cases, alumina may be reduced to aluminum metal by carbon contained in silicon carbide. Since the melting point of aluminum is low (about 660° C.), in the case in which the neck areas are composed of aluminum metal and the honeycomb filter 10 is used at high temperature (e.g., about 900° C.), it is believed that the strength is decreased under the influence of the aluminum metal present in the neck areas. In particular, as the amount of elemental Al present increases, the neck areas composed of aluminum metal increase. When the neck areas composed of aluminum metal increase, the high-temperature strength of the honeycomb filter 10 decreases. The strength is assumed to decrease significantly at a temperature higher than the melting point of an element (e.g., Al) contained in the sintering aid. On the other hand, when the mixing ratio of alumina, which is a sintering aid, is low, the effect of accelerating sintering of silicon carbide cannot be displayed, resulting in a decrease in strength. Consequently, when the mixing ratio of alumina is in a predetermined range (about 0.1% to about 1.0% by weight) relative to the total amount of silicon carbide and alumina, sintering of silicon carbide can be accelerated, and a decrease in the ratio of the strength at high temperature to the strength at room temperature can be relatively easily suppressed. Furthermore, when the aluminum component contained in the honeycomb filter 10 (in particular, grain boundaries and neck areas of silicon carbide) obtained by firing is, in terms of aluminum metal, in the range of about 0.05% to about 0.5%, the ratio of the strength at high temperature to the strength at room temperature is high.

According to the embodiments described above in detail, during the production of the honeycomb filter 10, silicon carbide and alumina are mixed to form a puddle, the puddle is molded into a molded body under a pressure of about 20 MPa or less, and the resulting molded body is fired at a firing temperature that is lower than the temperature at which sintering is performed without mixing a sintering aid. At this time, since sintering of ceramic particles is relatively easily accelerated by a sintering aid, it is more possible to perform firing at a low temperature compared with the case where ceramic particles are sintered without using a sintering aid. Furthermore, since the puddle is molded at a pressure of about 20 MPa or less, ceramic particles are not easily densified and a porous material can be obtained easily. Furthermore, when the amount of the sintering aid is about 1.0% by weight or less relative to the total amount of the ceramic particles and the sintering aid, the strength at high temperature does nor easily decrease. Consequently, in the production method, it is more possible to produce a honeycomb filter 10 (porous body) in which the firing temperature can be decreased and a decrease in the ratio of the strength at high temperature to the strength at room temperature can be suppressed.

From the study of the mixing ratio of a sintering aid in a dense body and a porous body, it has been found as a result that, in the porous body, unlike the dense body, even if the amount of the sintering aid is decreased, the relationship between the bending strength at high temperature and the bending strength at room temperature does not tend to reverse, and in the method for producing the porous body, a different result is obtained from that in the method for producing the dense body. With respect to a porous body of an embodiment of the invention, a preferable range of the mixing ratio of a sintering aid, in which a decrease of the strength at high temperature to the strength at room temperature can be relatively easily suppressed, has been found.

It is to be understood that the present invention is not limited to the embodiments described above, and various embodiments within the scope of the technical field of the present invention can be carried out.

EXAMPLES

Examples will be described below, in which honeycomb filters 10 were specifically produced.

Example 1

First, 7,000 parts by weight of α-silicon carbide powder (average particle size: 30 μm) as coarse-grained silicon carbide among ceramic particles, 3,000 parts by weight of a-silicon carbide powder (average particle size: 0.5 μm) as fine-grained silicon carbide among ceramic particles, and 2,970 parts by weight of water were mixed, and 1,050 parts by weight of methyl cellulose as an organic binder, 230 parts by weight of glycerol as a plasticizer, and 500 parts by weight of a lubricant (trade name: UNILUB; manufactured by NOF Corporation) were further added to the mixture, followed by kneading to obtain a puddle. In Example 1, γ-alumina (average particle size: 0.5 μm) as a sintering aid was not mixed. The puddle was extrusion-molded at a molding pressure of 5 MPa with an extruder into a rectangular pillar shape in which a plurality of through-holes were arranged in parallel in the longitudinal direction, and thereby a raw molded body in the shape of honeycomb filter 10 in which plugging portions 14 were not formed was obtained. Subsequently, the resulting raw molded body was dried with a microwave dryer. The end faces of a plurality of through-holes arranged in parallel in the longitudinal direction were alternately plugged with plugging portions 14 composed of a paste having the same composition as that of the puddle described above, followed by drying and degreasing at 400° C. for 3 hours. The molded body was fired at ordinary pressure under an argon atmosphere at 2,000° C. for 3 hours to form a honeycomb filter 10 composed of a silicon carbide sintered body having dimensions of 34.3 mm×34.3 mm×150 mm, 31 through-holes/cm$^2$ (200 cpsi), and partition walls with a thickness of 0.3 mm. Table 1 summarizes the numerical values, such as the average particle size of coarse-grained silicon carbide which is a starting material, the mixing ratio of silicon carbide relative to the total amount of silicon carbide (coarse-grained silicon carbide and fine-grained silicon carbide) and alumina, the mixing ratio of alumina relative to the total amount of silicon carbide and alumina, and the firing temperature with respect to the honeycomb filter 10 in Example 1. Note that the mixing ratio of each component is in terms of percent by weight relative to the total amount of coarse-grained silicon carbide, fine-grained silicon carbide, and alumina. Table 1 also shows the summary regarding Examples 2 to 27, which will be described below. In each Example, the mixing ratio between coarse-grained silicon carbide and fine-grained silicon carbide was set at 7:3. Furthermore, Table 1 also shows the measurement results of the pore size, porosity, three-point bending strength at room temperature, three-point bending strength at 900° C., and the ratio of three-point bending strength at 900° C. to three-point bending strength at room temperature (which is assumed to be 100) (hereinafter referred to as "ratio of high-temperature bending strength"), which correspond to the evaluation results described below.

TABLE 1

| Sample | SiC[1] particle size μm | SiC[2] mixing ratio % by weight | Al₂O₃ mixing ratio % by weight | Firing temperature °C. | Pore size μm | Porosity % | Bending strength at room temperature Mpa | Bending strength at 900° C. Mpa | Ratio of high-temperature bending strength % |
|---|---|---|---|---|---|---|---|---|---|
| Example 1 | 30 | 100 | 0 | 2000 | 7.1 | 42.9 | 7 | 6.1 | 87.14 |
| Example 2 | 30 | 99.95 | 0.05 | 2000 | 7.0 | 43.6 | 10 | 8.1 | 81.00 |
| Example 3 | 30 | 99.9 | 0.1 | 2000 | 6.9 | 42.4 | 31 | 29.4 | 94.84 |
| Example 4 | 30 | 99.7 | 0.3 | 2000 | 7.1 | 42.8 | 39 | 32.2 | 82.56 |
| Example 5 | 30 | 99.5 | 0.5 | 2000 | 8.9 | 39.4 | 42 | 31.5 | 75.00 |
| Example 6 | 30 | 99.3 | 0.7 | 2000 | 9.0 | 41.0 | 42 | 30.0 | 71.43 |
| Example 7 | 30 | 99 | 1 | 2000 | 9.1 | 44.8 | 43 | 27.1 | 63.02 |
| Example 8 | 30 | 97 | 3 | 2000 | 8.9 | 42.6 | 45 | 18.9 | 42.00 |
| Example 9 | 30 | 95 | 5 | 2000 | 9.0 | 43.1 | 50 | 11.6 | 23.20 |
| Example 10 | 30 | 100 | 0 | 2050 | 7.2 | 42.5 | 11 | 8.9 | 80.91 |
| Example 11 | 30 | 99.95 | 0.05 | 2050 | 7.1 | 42.1 | 16 | 13.3 | 83.13 |
| Example 12 | 30 | 99.9 | 0.1 | 2050 | 7.0 | 43.6 | 32 | 30.2 | 94.38 |
| Example 13 | 30 | 99.7 | 0.3 | 2050 | 7.3 | 41.8 | 41 | 33.9 | 82.68 |
| Example 14 | 30 | 99.5 | 0.5 | 2050 | 9.4 | 41.6 | 42 | 32.8 | 78.10 |
| Example 15 | 30 | 99.3 | 0.7 | 2050 | 9.3 | 43.9 | 43 | 31.1 | 72.33 |
| Example 16 | 30 | 99 | 1 | 2050 | 9.1 | 40.2 | 42 | 28.3 | 67.38 |
| Example 17 | 30 | 97 | 3 | 2050 | 9.0 | 39.7 | 51 | 20.4 | 40.00 |
| Example 18 | 30 | 95 | 5 | 2050 | 9.1 | 42.0 | 54 | 14.7 | 27.22 |
| Example 19 | 30 | 100 | 0 | 2100 | 7.2 | 41.8 | 17 | 15.0 | 88.24 |
| Example 20 | 30 | 99.95 | 0.05 | 2100 | 7.2 | 44.8 | 19 | 16.9 | 88.95 |
| Example 21 | 30 | 99.9 | 0.1 | 2100 | 7.2 | 43.7 | 32 | 29.9 | 93.44 |
| Example 22 | 30 | 99.7 | 0.3 | 2100 | 7.5 | 39.2 | 41 | 38.0 | 92.68 |
| Example 23 | 30 | 99.5 | 0.5 | 2100 | 9.8 | 40.6 | 47 | 40.9 | 87.02 |
| Example 24 | 30 | 99.3 | 0.7 | 2100 | 9.8 | 41.4 | 43 | 35.0 | 81.40 |
| Example 25 | 30 | 99 | 1 | 2100 | 10.5 | 44.5 | 44 | 30.9 | 70.23 |
| Example 26 | 30 | 97 | 3 | 2100 | 9.2 | 42.8 | 55 | 23.3 | 42.36 |
| Example 27 | 30 | 95 | 5 | 2100 | 9.2 | 43.8 | 56 | 18.2 | 32.50 |

[1]Average particle size of coarse-grained silicon carbide
[2]Mixing ratio of silicon carbide (corase-grained silicon carbide plus fine-grained silicon carbide)

Examples 2 to 27

Honeycomb filters 10 in Examples 2 to 9 were produced as in Example 1 except that γ-alumina (average particle size: 0.5 μm) as a sintering aid was mixed to the starting materials at a mixing ratio (0% to 5% by weight) shown in Table 1 and designing was performed as shown in Table 1. Furthermore, honeycomb filters 10 in Examples 10 to 18 were produced as in Example 1 except that the firing temperature was set at 2,050° C. and designing was performed so as to satisfy the mixing ratios shown in Table 1. Furthermore, honeycomb filters 10 in Examples 19 to 27 were produced as in Example 1 except that the firing temperature was set at 2,100° C. and designing was performed so as to satisfy the mixing ratios shown in Table 1.

Examples 28 to 54

Honeycomb filters 10 in Examples 28 to 36 were produced as in Example 1 except that the average particle size of coarse-grained silicon carbide was set at 22 μm, the firing temperature was set at 2,000° C., and designing was performed so as to satisfy the mixing ratios shown in Table 2. Furthermore, honeycomb filters 10 in Examples 37 to 45 were produced as in Example 1 except that the average particle size of coarse-grained silicon carbide was set at 22 μm, the firing temperature was set at 2,050° C., and designing was performed so as to satisfy the mixing ratios shown in Table 2. Furthermore, honeycomb filters 10 in Examples 46 to 54 were produced as in Example 1 except that the average particle size of coarse-grained silicon carbide was set at 22 μm, the firing temperature was set at 2,100° C., and designing was performed so as to satisfy the mixing ratios shown in Table 2. Table 2 shows the average particle size of coarse-grained silicon carbide which is a starting material, the mixing ratio of the entire silicon carbide, the mixing ratio of alumina, and the firing temperature with respect to the honeycomb filters 10 in Examples 28 to 54, and also summarizes the measurement results of the pore size, porosity, three-point bending strength at room temperature, three-point bending strength at 900° C., and the ratio of high-temperature bending strength, which will be described below.

TABLE 2

| Sample | SiC[1] particle size μm | SiC[2] mixing ratio % by weight | Al₂O₃ mixing ratio % by weight | Firing temperature °C. | Pore size μm | Porosity % | Bending strength at room temperature Mpa | Bending strength at 900° C. Mpa | Ratio of high-temperature bending strength % |
|---|---|---|---|---|---|---|---|---|---|
| Example 28 | 22 | 100 | 0 | 2000 | 6.9 | 43.4 | 25 | 22.7 | 90.80 |
| Example 29 | 22 | 99.95 | 0.05 | 2000 | 6.9 | 43.3 | 24 | 22.1 | 92.08 |
| Example 30 | 22 | 99.9 | 0.1 | 2000 | 7.0 | 43.1 | 29 | 28.4 | 97.93 |
| Example 31 | 22 | 99.7 | 0.3 | 2000 | 7.3 | 41.8 | 41 | 37.7 | 91.95 |
| Example 32 | 22 | 99.5 | 0.5 | 2000 | 7.4 | 42.0 | 50 | 46.0 | 92.00 |
| Example 33 | 22 | 99.3 | 0.7 | 2000 | 8.0 | 40.9 | 46 | 39.0 | 84.78 |

TABLE 2-continued

| Sample | SiC[1] particle size μm | SiC[2] mixing ratio % by weight | Al₂O₃ mixing ratio % by weight | Firing temperature °C. | Pore size μm | Porosity % | Bending strength at room temperature Mpa | Bending strength at 900° C. Mpa | Ratio of high-temperature bending strength % |
|---|---|---|---|---|---|---|---|---|---|
| Example 34 | 22 | 99 | 1 | 2000 | 8.6 | 39.2 | 45 | 26.0 | 57.78 |
| Example 35 | 22 | 97 | 3 | 2000 | 8.7 | 42.1 | 43 | 18.2 | 42.33 |
| Example 36 | 22 | 95 | 5 | 2000 | 8.9 | 43.1 | 48 | 12.8 | 26.67 |
| Example 37 | 22 | 100 | 0 | 2050 | 7.0 | 40.9 | 31 | 28.4 | 91.61 |
| Example 38 | 22 | 99.95 | 0.05 | 2050 | 7.0 | 41.2 | 29 | 26.7 | 92.07 |
| Example 39 | 22 | 99.9 | 0.1 | 2050 | 7.1 | 43.3 | 32 | 30.1 | 94.06 |
| Example 40 | 22 | 99.7 | 0.3 | 2050 | 7.7 | 42.2 | 41 | 35.9 | 87.56 |
| Example 41 | 22 | 99.5 | 0.5 | 2050 | 8.1 | 44.7 | 47 | 41.4 | 88.09 |
| Example 42 | 22 | 99.3 | 0.7 | 2050 | 8.1 | 43.6 | 46 | 39.8 | 86.52 |
| Example 43 | 22 | 99 | 1 | 2050 | 8.4 | 41.6 | 47 | 27.8 | 59.15 |
| Example 44 | 22 | 97 | 3 | 2050 | 8.9 | 42.6 | 47 | 19.0 | 40.43 |
| Example 45 | 22 | 95 | 5 | 2050 | 9.0 | 43.7 | 50 | 12.1 | 24.20 |
| Example 46 | 22 | 100 | 0 | 2100 | 7.0 | 43.3 | 38 | 34.4 | 90.53 |
| Example 47 | 22 | 99.95 | 0.05 | 2100 | 7.1 | 40.4 | 38 | 32.5 | 85.53 |
| Example 48 | 22 | 99.9 | 0.1 | 2100 | 7.2 | 40.5 | 33 | 29.7 | 90.00 |
| Example 49 | 22 | 99.7 | 0.3 | 2100 | 7.7 | 42.3 | 43 | 40.0 | 93.02 |
| Example 50 | 22 | 99.5 | 0.5 | 2100 | 8.7 | 44.6 | 54 | 45.0 | 83.33 |
| Example 51 | 22 | 99.3 | 0.7 | 2100 | 8.9 | 43.6 | 54 | 43.6 | 80.74 |
| Example 52 | 22 | 99 | 1 | 2100 | 8.8 | 42.5 | 53 | 32.2 | 60.75 |
| Example 53 | 22 | 97 | 3 | 2100 | 9.0 | 40.8 | 52 | 21.5 | 41.35 |
| Example 54 | 22 | 95 | 5 | 2100 | 9.2 | 40.6 | 55 | 15.5 | 28.18 |

[1] Average particle size of coarse-grained silicon carbide
[2] Mixing ratio of silicon carbide (corase-grained silicon carbide plus fine-grained silicon carbide)

Example 55

First, 6,993 parts by weight of coarse-grained silicon carbide (average particle size: 30 μm), 2,997 parts by weight of fine-grained silicon carbide (average particle size: 0.5 μm), 10 parts by weight of γ-alumina (average particle size: 0.5 μm) as a sintering aid, and 2,970 parts by weight of water were mixed, and 980 parts by weight of an acrylic resin as a pore-forming agent, 1,050 parts by weight of methyl cellulose as an organic binder, 230 parts by weight of glycerol as a plasticizer, and 500 parts by weight of a lubricant (trade name: UNILUB; manufactured by NOF Corporation) were further added to the mixture, followed by kneading to obtain a puddle. The puddle was subjected to molding and firing as in Example 1 to obtain a honeycomb filter 10 composed of a silicon carbide sintered body having dimensions of 34.3 mm×34.3 mm×150 mm, 31 through-holes/cm² (200 cpsi), and partition walls with a thickness of 0.3 mm. Table 3 summarizes the numerical values, such as the average particle size of coarse-grained silicon carbide which is a starting material, the mixing ratio of silicon carbide, the mixing ratio of alumina, the mixing ratio of the pore-forming agent, the firing temperature, the pore size, the porosity, and the ratio of high-temperature bending strength with respect to the honeycomb filters 10 in Examples 55 to 75. Note that in the samples shown in Table 1, the average particle size of coarse-grained silicon carbide was set at 30 μm; in the samples shown in Table 2, the average particle size of coarse-grained silicon carbide was set at 22 μm; and in the samples shown in Table 3, the pore-forming agent was added to increase the porosity of the samples shown in Table 1.

TABLE 3

| Sample | SiC[1] particle size μm | SiC[2] mixing ratio % by weight | Al₂O₃ mixing ratio % by weight | Pore-forming agent mixing ratio[3] % by weight | Firing temperature °C. | Pore size μm | Porosity % | Ratio of high-temperature bending strength % |
|---|---|---|---|---|---|---|---|---|
| Example 55 | 30 | 99.9 | 0.1 | 9.8 | 2000 | 19.2 | 57.1 | 92.8 |
| Example 56 | 30 | 99.7 | 0.3 | 9.8 | 2000 | 20.5 | 58.4 | 91.1 |
| Example 57 | 30 | 99.5 | 0.5 | 9.8 | 2000 | 22.5 | 59.1 | 83.8 |
| Example 58 | 30 | 99.3 | 0.7 | 9.8 | 2000 | 21.8 | 57.9 | 75.2 |
| Example 59 | 30 | 99.0 | 1.0 | 9.8 | 2000 | 21.1 | 60.2 | 70.7 |
| Example 60 | 30 | 97.0 | 3.0 | 9.8 | 2000 | 21.6 | 57.8 | 40.2 |
| Example 61 | 30 | 95.0 | 5.0 | 9.8 | 2000 | 22.5 | 61.2 | 22.0 |
| Example 62 | 30 | 99.9 | 0.1 | 9.8 | 2050 | 18.8 | 57.3 | 90.6 |
| Example 63 | 30 | 99.7 | 0.3 | 9.8 | 2050 | 21.7 | 56.9 | 82.2 |
| Example 64 | 30 | 99.5 | 0.5 | 9.8 | 2050 | 22.0 | 59.1 | 80.0 |
| Example 65 | 30 | 99.3 | 0.7 | 9.8 | 2050 | 20.6 | 57.4 | 78.9 |
| Example 66 | 30 | 99.0 | 1.0 | 9.8 | 2050 | 22.2 | 60.3 | 73.0 |
| Example 67 | 30 | 97.0 | 3.0 | 9.8 | 2050 | 22.4 | 57.4 | 39.6 |
| Example 68 | 30 | 95.0 | 5.0 | 9.8 | 2050 | 21.1 | 59.9 | 27.7 |
| Example 69 | 30 | 99.9 | 0.1 | 9.8 | 2100 | 21.4 | 58.0 | 93.3 |
| Example 70 | 30 | 99.7 | 0.3 | 9.8 | 2100 | 20.1 | 60.9 | 93.2 |
| Example 71 | 30 | 99.5 | 0.5 | 9.8 | 2100 | 20.7 | 60.4 | 90.2 |
| Example 72 | 30 | 99.3 | 0.7 | 9.8 | 2100 | 22.7 | 55.8 | 83.3 |
| Example 73 | 30 | 99.0 | 1.0 | 9.8 | 2100 | 22.4 | 59.3 | 71.6 |

TABLE 3-continued

| Sample | SiC[1] particle size μm | SiC[2] mixing ratio % by weight | Al$_2$O$_3$ mixing ratio % by weight | Pore-forming agent mixing ratio[3] % by weight | Firing temperature °C. | Pore size μm | Porosity % | Ratio of high-temperature bending strength % |
|---|---|---|---|---|---|---|---|---|
| Example 74 | 30 | 97.0 | 3.0 | 9.8 | 2100 | 20.5 | 56.5 | 41.7 |
| Example 75 | 30 | 95.0 | 5.0 | 9.8 | 2100 | 22.8 | 60.4 | 28.0 |

[1]Average particle size of coarse-grained silicon carbide
[2]Mixing ratio of silicon carbide (corase-grained silicon carbide plus fine-grained silicon carbide)
[3]Pore-forming agent mixing ratio to total of silicon carbide and alumina as 100

Examples 56 to 75

Honeycomb filters 10 in Examples 56 to 61 were produced as in Example 55 except that γ-alumina (average particle size: 0.5 μm) as a sintering aid was mixed to the starting materials so as to satisfy the mixing ratio (0.1% to 5% by weight) shown in Table 3 and designing was performed as shown in Table 3. Furthermore, honeycomb filters 10 in Examples 62 to 68 were produced as in Example 55 except that the firing temperature was set at 2,050° C. and designing was performed so as to satisfy the mixing ratios shown in Table 3. Furthermore, honeycomb filters 10 in Examples 69 to 75 were produced as in Example 55 except that the firing temperature was set at 2,100° C. and designing was performed so as to satisfy the mixing ratios shown in Table 3.

[SEM Observation]

With respect to Examples 7, 9, 57, and 61, SEM observation was performed. SEM was carried out using a S-4300 manufactured by Hitachi, Ltd. Herein, a cross section obtained by slicing each honeycomb filter 10 was observed without sputter-coating.

[Three-Point Bending Strength]

With respect to Examples 1 to 75, three-point bending strength was measured. The measurement was carried out at room temperature (25° C.) and at 900° C. according to JIS-R1601 using an Instron 5582 as a measuring apparatus. Specifically, using equivalent samples to the sintered bodies in Examples 1 to 75, the samples being obtained by extrusion-molding into a plate shape with dimensions of 4 mm×3 mm×40 mm so as to satisfy the mixing ratios, the pore size, and the porosity shown in Tables 1 to 3, followed by firing and processing, at a crosshead speed of 0.5 mm/min and with a span of 30 mm, breaking load was measured by applying a load in a perpendicular direction to calculate the strength. Each sample was measured at room temperature (25° C.) and at 900° C. Measurement at 900° C. was carried out soon after the sample was brought out of the furnace after being placed in the firing furnace that is set at 900° C. The contents of JIS-R1601 are incorporated herein by reference.

[Measurement of Average Pore Size and Porosity]

With respect to Examples 1 to 75, the average pore size and porosity were measured. The measurement was carried out by a mercury press-in method according to JIS-R1655 using an automated porosimeter AutoPore III 9405 manufactured by Shimadzu Corporation as a measuring apparatus. Specifically, each honeycomb filter 10 was cut into a cube with edges of about 0.8 cm, and the cube was subjected to supersonic cleaning with ion-exchanged water, followed by drying. Then, measurement was carried out using the measuring apparatus described above in a measurement range of 0.2 to 500 μm. The measurement was carried out every 0.1 psia in a range of 100 to 500 μm, and every 0.25 psia in a range of 0.2 to 100 μm. The contents of JIS-R1655 are incorporated herein by reference.

[Elemental Analysis Measurement]

With respect to Examples 7 to 9, elemental analysis measurement was carried out. The purpose of the measurement is to determine and confirm the amount of the aluminum component contained in the fired honeycomb filter 10. The elemental analysis measurement was carried out with respect to aluminum by ICP atomic emission spectrometry method according to JIS-R1616 and JIS-K0116 using a Perkin-Elmer Optima 3300DV as a measuring apparatus. The sample to be measured was prepared by a method in which each sample was placed in a pressure decomposition container, thermal decomposition was performed using hydrofluoric acid, nitric acid, and sulfuric acid, silicon was evaporated, and then a hydrochloric acid solution was prepared for measurement. The sample preparation method described above is mainly used for measuring the aluminum component present in the grain boundaries of silicon carbide. The contents of JIS-R1616 and JIS-K0116 are incorporated herein by reference.

[Experimental Results]

Figure 4:
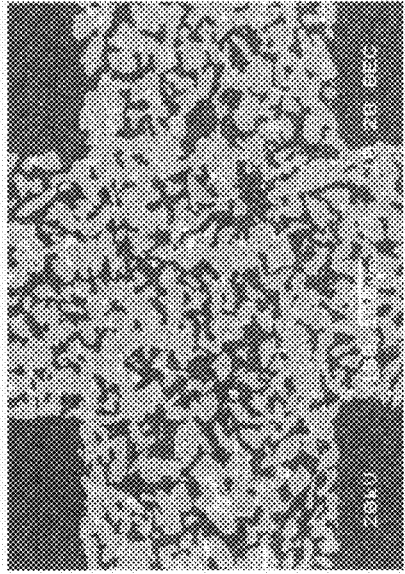
FIG. 4 shows SEM micrographs in Examples 7 and 9 according to an embodiment of the present invention.
Figure 4:
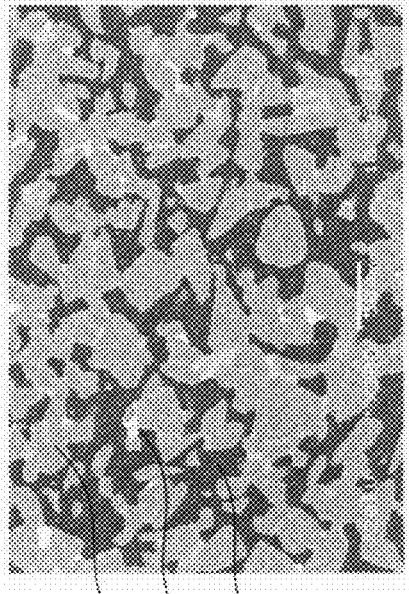
Figure 4:
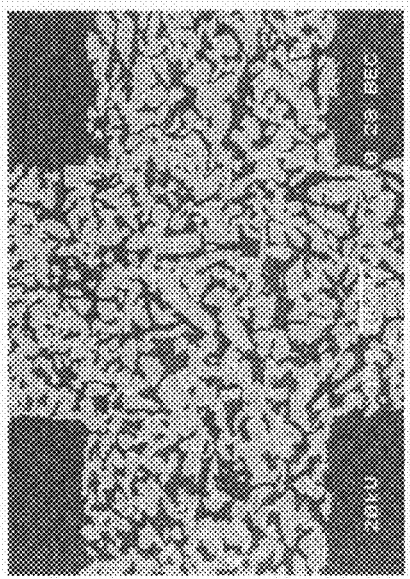
Figure 4:
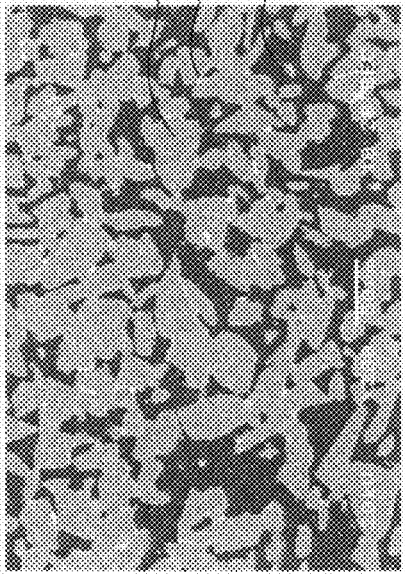

FIGS. 4(*a*) and 4(*b*) are SEM micrographs of the sample in Example 7 taken at ×150 and ×300, respectively. FIGS. 4(*c*) and 4(*d*) are SEM micrographs of the sample in Example 9 taken at ×150 and ×300, respectively. The sample in Example 7 has an alumina mixing ratio of 1% by weight, and the sample in Example 9 has an alumina mixing ratio of 5% by weight. Each of the samples in Examples 7 and 9 has a porosity of about 42%. In FIGS. 4(*b*) and 4(*d*), point A represents silicon carbide, point B represents aluminum, and point C represents a pore. It has been confirmed from FIGS. 4(*b*) and 4(*d*), in each of the samples, neck areas are mainly composed of silicon carbide, and aluminum is present in parts of the neck areas. It has also been confirmed that the amount of aluminum present in the neck areas is small in Example 7 compared with that in Example 9.

Figure 5:
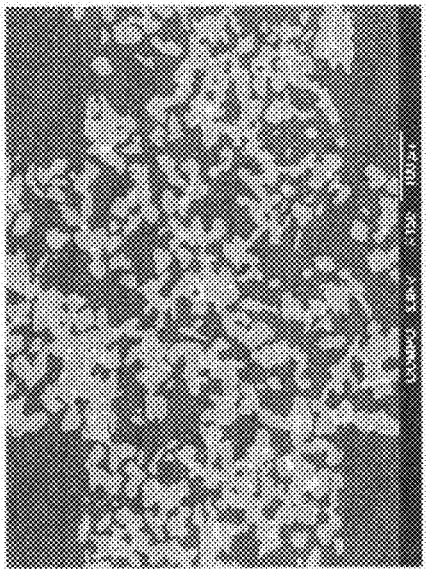
FIG. 5 shows SEM micrographs in Examples 57 and 61.
Figure 5:
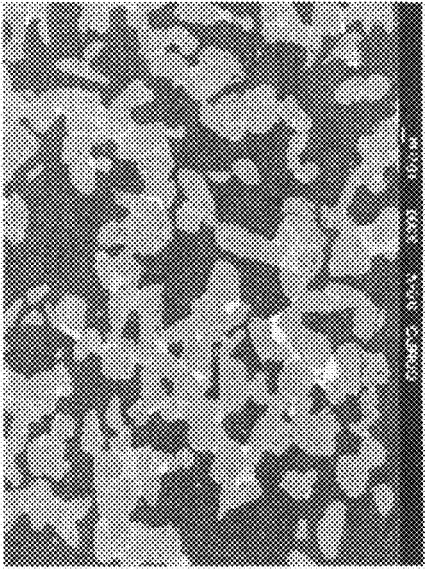
Figure 5:
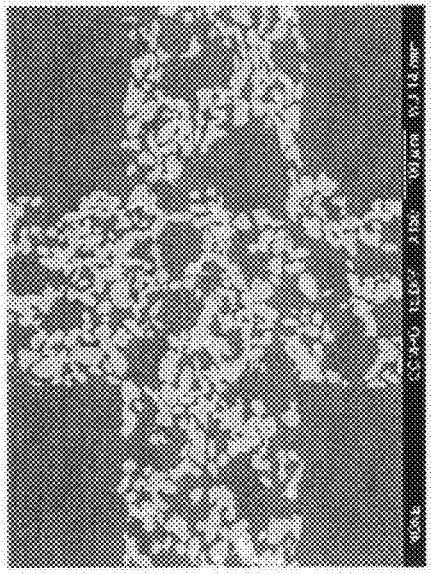
Figure 5:
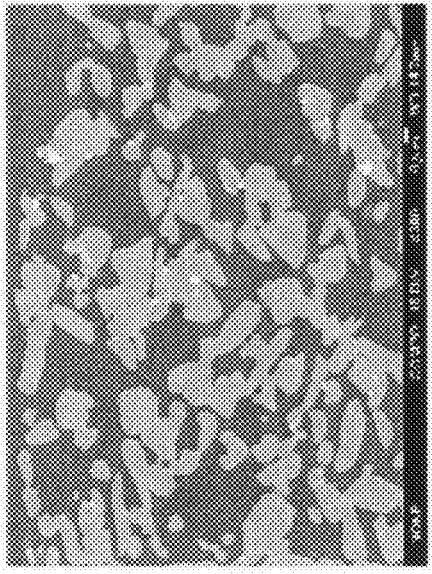

FIGS. 5(*a*) and 5(*b*) are SEM micrographs of the sample in Example 57 taken at ×150 and ×300, respectively. FIGS. 5(*c*) and 5(*d*) are SEM micrographs of the sample in Example 61 taken at ×150 and ×300, respectively. The sample in Example 57 has an alumina mixing ratio of 0.5% by weight, and the sample in Example 61 has an alumina mixing ratio of 5% by weight. Each of the samples in Examples 57 and 51 has a porosity of about 60%. As in FIGS. 4(*b*) and 4(*d*), it has been confirmed from FIGS. 5(*b*) and 5(*d*), in each of the samples, neck areas are mainly composed of silicon carbide, and aluminum is present in parts of the neck areas. It has also been confirmed that the amount of aluminum present in the neck areas is small in Example 57 compared with that in Example 61. It has been assumed that aluminum presents in the neck areas influences the bending strength at high temperature (900° C.).

With respect to the results of elemental analysis in Examples 7 to 9, in Example 7, the amount of alumina as a sintering aid added was 1% by weight (0.53% by weight in terms of aluminum metal) while the amount of alumina contained in the fired honeycomb filter 10 was 0.89% by weight (0.47% by weight in terms of aluminum metal). In Example 8, the amount of alumina added was 3% by weight (1.59% by weight in terms of aluminum metal) while the amount of alumina contained in the fired honeycomb filter 10 was 2.44% by weight (1.29% by weight in terms of aluminum metal). In Example 9, the amount of alumina added was 5% by weight (2.65% by weight in terms of aluminum metal) while the amount of alumina contained in the fired honeycomb filter 10 was 2.44% by weight (2.07% by weight in terms of aluminum metal).

Figure 6:
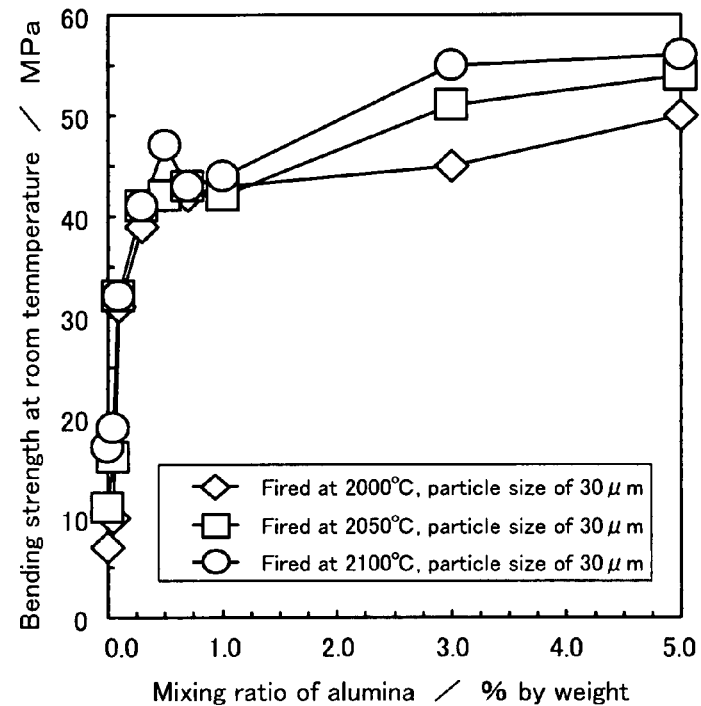
FIG. 6 shows graphs showing the relationships between the alumina mixing ratio and the three-point bending strength in Examples 1 to 27.
Figure 6:
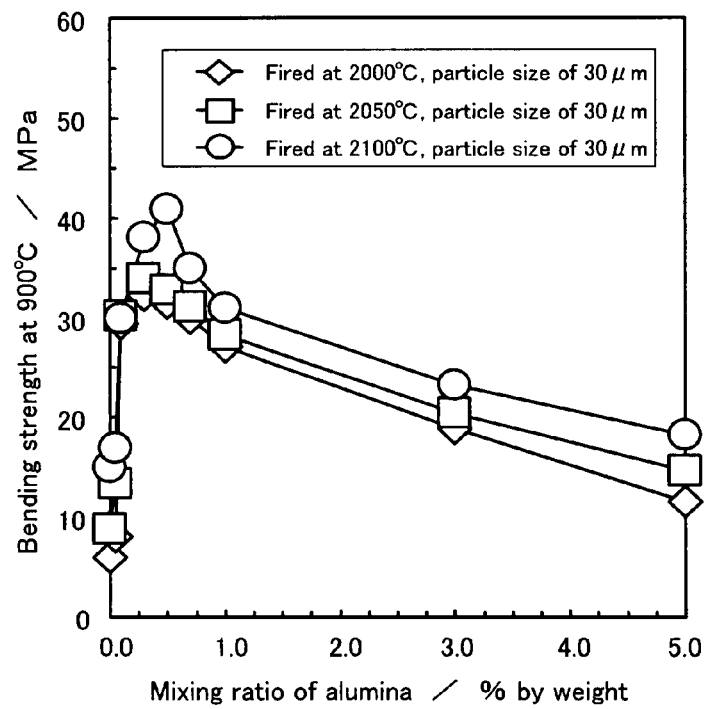
Figure 7:
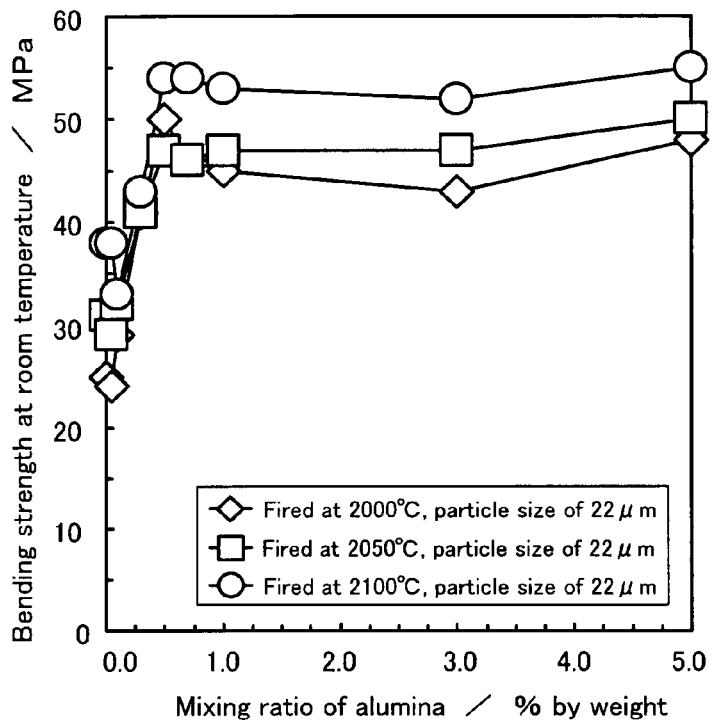
FIG. 7 shows graphs showing the relationships between the alumina mixing ratio and the three-point bending strength in Examples 28 to 54.
Figure 7:
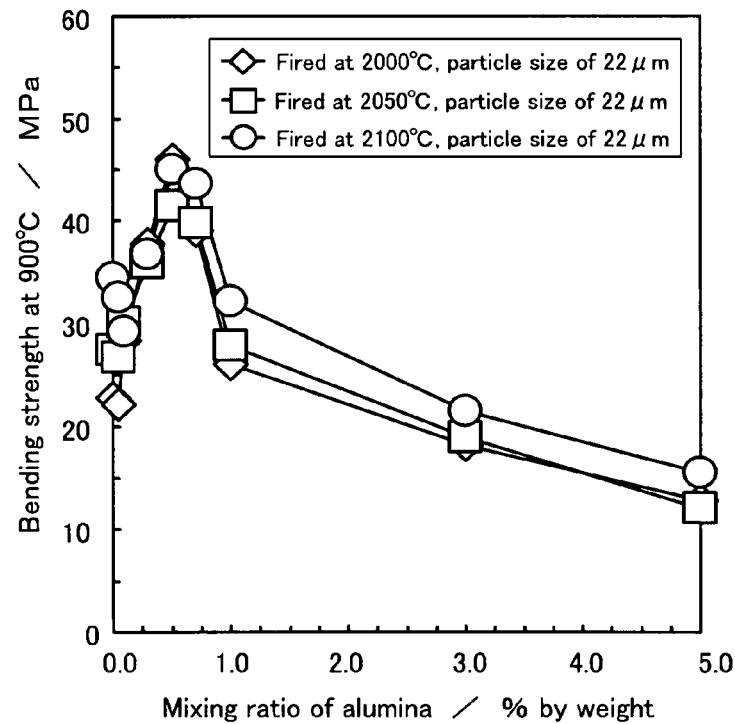
Figure 8:
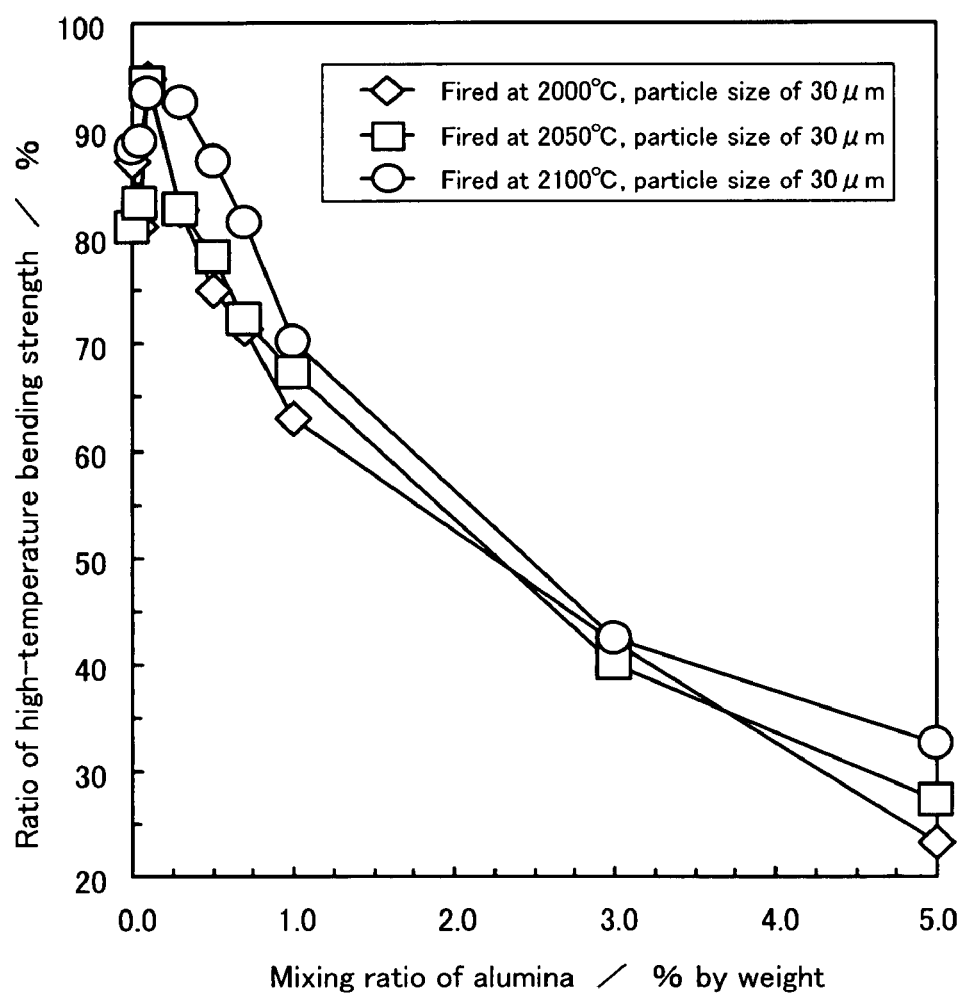
FIG. 8 is a graph showing the relationship between the alumina mixing ratio and the ratio of high-temperature bending strength in Examples 1 to 27.
Figure 9:
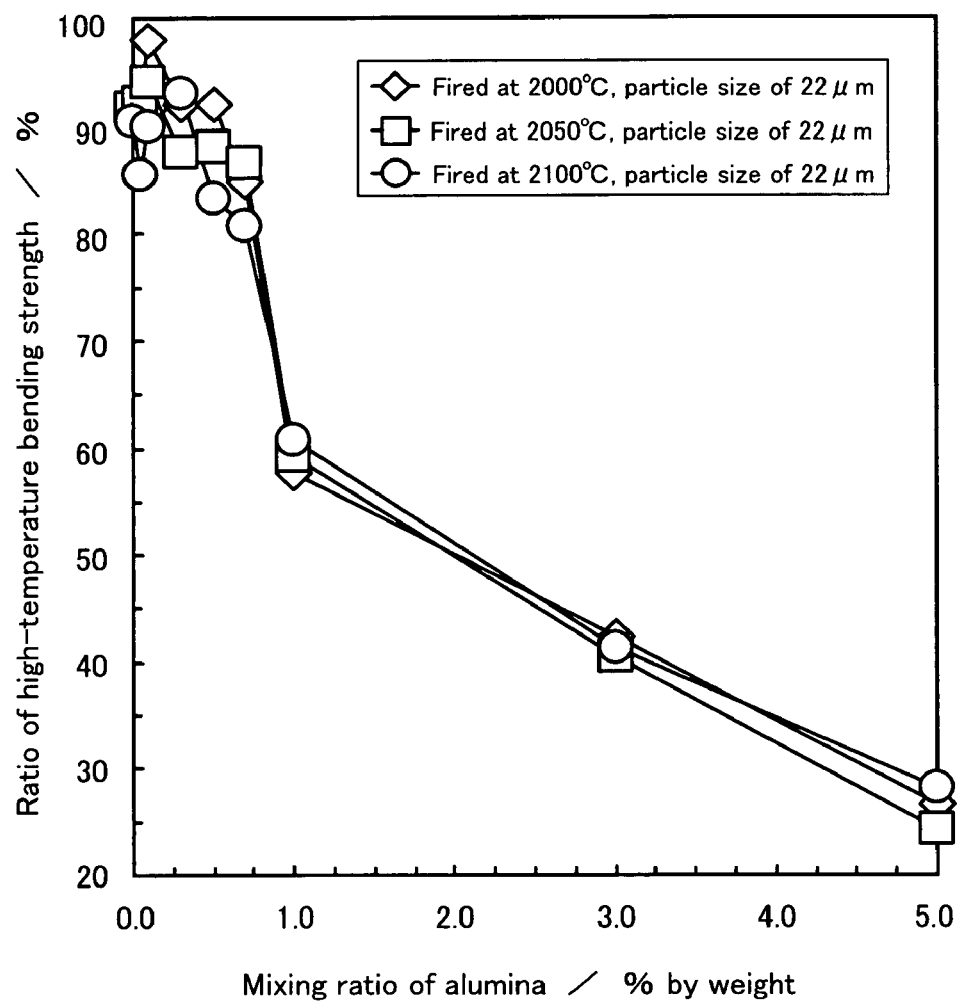
FIG. 9 is a graph showing the relationship between the alumina mixing ratio and the ratio of high-temperature bending strength in Examples 28 to 54.
Figure 10:
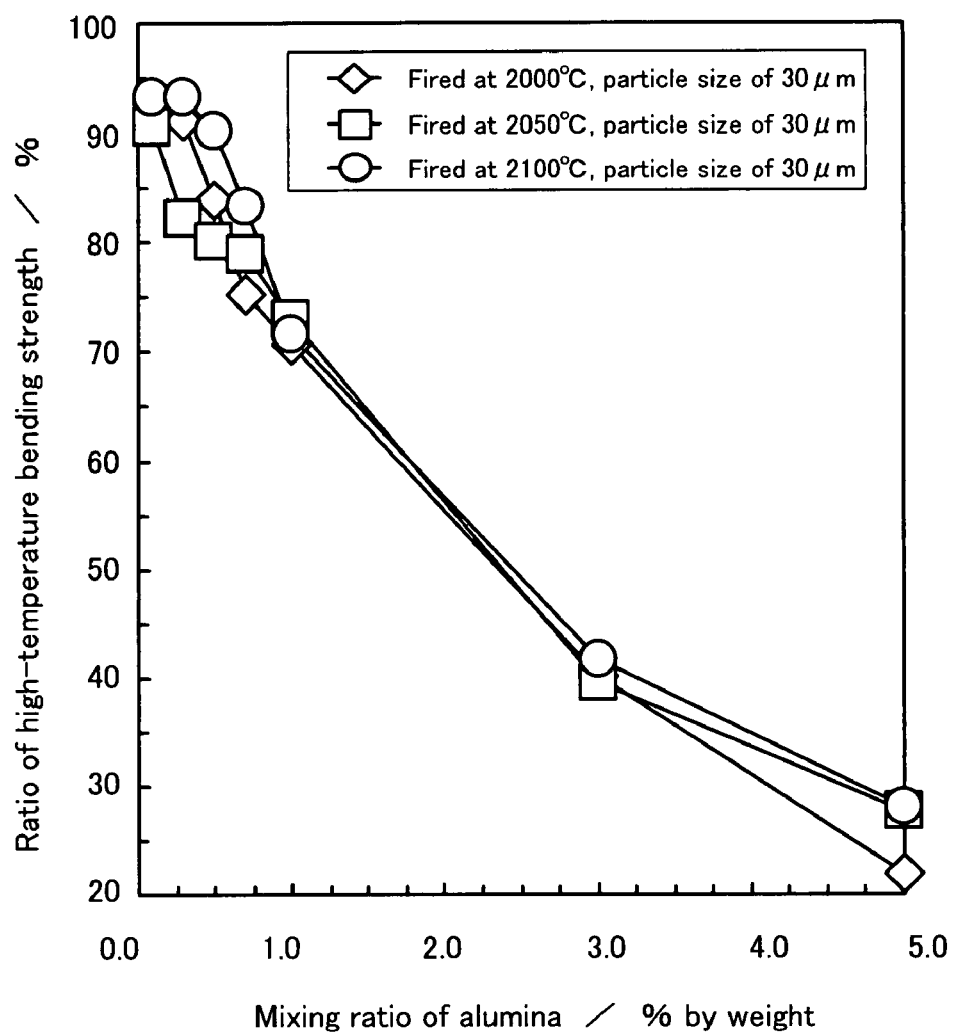
FIG. 10 is a graph showing the relationship between the alumina mixing ratio and the ratio of high-temperature bending strength in Examples 55 to 75.

Data in Examples 1 to 75 shown in Tables 1 to 3 will now be explained with reference to the graphs. FIG. 6(a) is a graph showing the relationship between the alumina mixing ratio and the bending strength at room temperature in Examples 1 to 27, and FIG. 6(b) is a graph showing the relationship between the alumina mixing ratio and the bending strength at 900° C. in Examples 1 to 27. FIG. 7(a) is a graph showing the relationship between the alumina mixing ratio and the bending strength at room temperature in Examples 28 to 54, and FIG. 7(b) is a graph showing the relationship between the alumina mixing ratio and the bending strength at 900° C. in Examples 28 to 54. FIG. 8 is a graph showing the relationship between the alumina mixing ratio and the ratio of high-temperature bending strength in Examples 1 to 27. FIG. 9 is a graph showing the relationship between the alumina mixing ratio and the ratio of high-temperature bending strength in Examples 28 to 54. FIG. 10 is a graph showing the relationship between the alumina mixing ratio and the ratio of high-temperature bending strength in Examples 55 to 75.

As is evident from Tables 1 to 3, FIGS. 6(a) and 6(b) and FIGS. 7(a) and 7(b), in all the samples, the samples in which alumina was mixed has improved three-point bending strength compared with the samples in which alumina was not mixed, and sintering of silicon carbide is accelerated by alumina. As the alumina mixing ratio increases, the bending strength tends to improve. In particular, at an alumina mixing ratio of about 0.1% by weight or more, improvement in bending strength is significant. Although the difference is not significant, coarse-grained silicon carbide having an average particle size of 22 μm exhibits slightly higher bending strength than coarse-grained silicon carbide having an average particle size of 30 μm. On the other hand, as is evident from FIGS. 8 to 10, at an alumina mixing ratio of about 1.0% by weight or less, the ratio of high-temperature bending strength is about 55% or more, and a decrease in the high-temperature bending strength is suppressed. In particular, in the samples with an alumina mixing ratio of about 0.7% by weight or less, the ratio of high-temperature bending strength is about 80% or more, and the decrease in the high-temperature bending strength is further suppressed. As shown in FIG. 10, even if the porosity is set at about 60%, this trend does not substantially change. It has been found that, in the samples with an alumina mixing ratio of about 0.1% to about 1.0% by weight shown in FIGS. 6(a) and 6(b) and FIGS. 7(a) and 7(b) (Examples 3 to 7, Examples 12 to 16, Examples 21 to 25, Examples 30 to 34, Examples 39 to 43, and Examples 48 to 52), both the bending strength at 900° C. and the bending strength at room temperature is about 25 MPa or more, which is sufficient for practical use. As is evident from these results, in the production of a porous body, an alumina mixing ratio of about 0.1% to about 1.0% by weight is preferable. Consequently, it has been confirmed that, according to a method for producing a porous body in which silicon carbide as ceramic particles and alumina as a sintering aid are mixed such that the alumina mixing ratio is about 0.1% to about 1.0% by weight, and molding is performed at a pressure of about 20 MPa or less, followed by firing, the sintering temperature can be decreased and a decrease in the ratio of the strength at high temperature to the strength at room temperature can be suppressed. Furthermore, in the honeycomb filters 10 produced by this production method, the bending strength at 900° C. is about 55% or more (in particular about 80% or more) relative to the bending strength at room temperature, and thus it has been confirmed that the decrease in the ratio of the strength at high temperature to the strength at room temperature is suppressed.

The present invention is a continuation of PCT/JP2005/017367 filed on Sep. 21, 2005, claiming priority from Japanese Patent Application No. 2004-287908 filed on Sep. 30, 2004, the entire contents of which are incorporated herein by reference.

What is claimed is:

1. A method for producing a porous, honeycomb structure, comprising:
   preparing a starting material comprising ceramic particles serving as an aggregate and a sintering aid, wherein the ceramic particles consist of silicon carbide, the sintering aid includes at least one element selected from the group consisting of rare earth elements, alkaline earth elements, Al, and Si, and the amount of the sintering aid is about 0.1% to about 0.7% by weight relative to the total weight of the ceramic particles and the sintering aid;
   molding the starting material into a honeycomb body; and
   firing the honeycomb body into a sintered porous honeycomb body, whose porosity is about 35% to about 70%.

2. The method for producing the porous, honeycomb body according to claim 1, wherein the sintering aid includes alumina.

3. The method for producing the porous, honeycomb body according to claim 1, wherein the temperature of firing the molded body is in the range of about 1,900° C. to about 2,100° C.

4. The method for producing the porous, honeycomb body according to claim 1, wherein the molded body is obtained by extrusion molding at a pressure of about 20 MPa or less.

5. The method for producing the porous, honeycomb body according to claim 1, wherein the ceramic particles comprise coarse-grained silicon carbide particles having a predetermined average particle size and fine-grained silicon carbide particles having an average particle size smaller than the predetermined average particle size.

6. The method for producing the porous, honeycomb body according to claim 5, wherein the average particle size of the coarse-grained silicon carbide particles is about 5 to about 100 μm, and the average particle size of the fine-grained silicon carbide particles is about 0.1 to about 10 μm.

7. The method for producing the porous, honeycomb body according to claim 1, wherein
   the ceramic particles comprise coarse-grained silicon carbide particles and fine-grained silicon carbide particles,
   the sintering aid comprises alumina, and
   the percentage of the coarse-grained silicon carbide particles and fine-grained silicon carbide particles, and alumina is about 60 to about 80% by weight and about 18 to about 38% by weight, respectively, of the total weight of the coarse-grained silicon carbide particles, fine-grained silicon carbide particles, and alumina.

8. A honeycomb structure comprising a sintered porous honeycomb body whose porosity is about 35% to about 70%, the sintered porous honeycomb body comprising:

ceramic particles serving as an aggregate; and a sintering aid comprising at least one element selected from the group consisting of rare earth elements, alkaline earth elements, Al, and Si, wherein the ceramic particles consist of silicon carbide, the amount of the sintering aid is about 0.1% to about 0.7% by weight relative to the total weight of the ceramic particles and the sintering aid, and the bending strength of the porous body at 900° C. is about 55% or more relative to the bending strength at room temperature.

9. The honeycomb structure according to claim 8, wherein the bending strength of the porous body at 900° C. is about 80% or more relative to the bending strength at room temperature.

10. The honeycomb structure according to claim 8, wherein both the bending strength of the porous body at 900° C. and the bending strength at room temperature are about 25 MPa or more.

11. The honeycomb structure according to claim 8, wherein the element in the porous body is Al.

12. The honeycomb structure according to claim 8, having a shape of cylindrical pillar, two opposite end faces, and multiple integrally molded through holes parallel to the longitudinal direction of the honeycomb structure.

13. The honeycomb structure according to claim 12, wherein each through hole has one open end at one end face of the honeycomb structure and one sealed end at the opposite end face of the honeycomb structure, and two through holes sharing a partition wall have one open end of one through hole and one sealed end of the other through hole at the same end face.

14. The honeycomb structure according to claim 12, wherein each through hole has one open end at each of the two end faces of the honeycomb structure.

15. A honeycomb structure, comprising:

a plurality of sintered porous honeycomb bodies wherein the sintered porous honeycomb body has a porosity of about 35% to about 70% and comprises ceramic particles serving as an aggregate; and a sintering aid comprising at least one element selected from the group consisting of rare earth elements, alkaline earth elements, Al, and Si, wherein the ceramic particles consist of silicon carbide, the amount of the sintering aid is about 0.1 to about 0.7% by weight relative to the total weight of the ceramic particles and the sintering aid, and the bending strength of the porous body at 900° C. is about 55% or more relative to the bending strength at room temperature;

a sealing layer that joins the porous bodies to each other; and a coating layer that coats an outer circumferential surface of the joined porous bodies, wherein each of the sintered porous honeycomb bodies has multiple through holes that are arranged along the longitudinal direction of the sintered porous honeycomb body.

16. The honeycomb structure according to claim 15, wherein each through hole has one open end at one end face of the honeycomb structure and one sealed end at the opposite end face of the honeycomb structure, and two through holes sharing a partition wall have one open end of one through hole and one sealed end of the other through hole at the same end face.

17. The honeycomb structure according to claim 15, wherein each through hole has one open end at each of the two end faces of the honeycomb structure.

* * * * *